(12) United States Patent
Lee

(10) Patent No.: US 11,035,942 B2
(45) Date of Patent: Jun. 15, 2021

(54) METHOD AND DEVICE FOR CORRECTING TARGET ANGLE ERROR OF RADAR SENSOR

(71) Applicants: Hyundai Motor Company, Seoul (KR); KIA Motors Corporation, Seoul (KR)

(72) Inventor: Dong-Ju Lee, Gyeonggi-do (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 215 days.

(21) Appl. No.: 16/204,234

(22) Filed: Nov. 29, 2018

(65) Prior Publication Data

US 2020/0081108 A1    Mar. 12, 2020

(30) Foreign Application Priority Data

Sep. 6, 2018    (KR) .................... 10-2018-0106425

(51) Int. Cl.
| | |
|---|---|
| *G01S 13/00* | (2006.01) |
| *G01S 13/44* | (2006.01) |
| *G01S 13/931* | (2020.01) |
| *G01S 13/36* | (2006.01) |
| *H04W 4/40* | (2018.01) |
| *G01S 13/06* | (2006.01) |
| *G01S 13/04* | (2006.01) |
| *G01S 13/50* | (2006.01) |
| *G01S 13/46* | (2006.01) |

(52) U.S. Cl.
CPC .......... *G01S 13/4427* (2013.01); *G01S 13/36* (2013.01); *G01S 13/931* (2013.01); *G01S 13/04* (2013.01); *G01S 13/06* (2013.01); *G01S 13/46* (2013.01); *G01S 13/50* (2013.01); *H04W 4/40* (2018.02)

(58) Field of Classification Search
CPC .... G01S 13/4427; G01S 13/36; G01S 13/931; G01S 13/04; G01S 13/06; G01S 13/46; G01S 13/50; G01S 1/00; G01S 2201/00; G01S 2201/01; G01S 3/32; G01S 3/325; H04W 4/40
USPC .......................... 342/27, 385, 427; 701/300
See application file for complete search history.

(56) References Cited

U.S. PATENT DOCUMENTS 5,070,336 A * 12/1991 Pringle ............... G01S 13/4418
                                                342/151
5,402,130 A *  3/1995 Sherman ............. G01S 13/4454
                                                342/152

(Continued)

FOREIGN PATENT DOCUMENTS

KR    20130130658 A    12/2013

*Primary Examiner* — Chuong P Nguyen
(74) *Attorney, Agent, or Firm* — Brinks Gilson & Lione

(57) ABSTRACT

A method of correcting a target angle error of a radar sensor, the method may include recognizing a first target angle of a target through the radar sensor; recognizing a second target angle of the target through V2X communication and then calculating a target angle error between the first target angle and the second target angle; comparing the target angle error with a predetermined critical error; and correcting a phase curve of the radar sensor by applying the target angle error to the phase curve in accordance with the comparison result, and then giving a target warning using the corrected phase curve.

8 Claims, 6 Drawing Sheets

(56) References Cited

U.S. PATENT DOCUMENTS

| | | | | |
|---|---|---|---|---|
| 6,144,333 | A * | 11/2000 | Cho | G06K 9/3241 |
| | | | | 342/149 |
| 7,202,810 | B2 * | 4/2007 | Mitsumoto | G01S 7/352 |
| | | | | 342/107 |
| 8,742,980 | B2 * | 6/2014 | Shirakawa | G01S 13/90 |
| | | | | 342/165 |
| 9,746,554 | B2 * | 8/2017 | Millar | G01S 13/449 |
| 10,569,771 | B2 * | 2/2020 | Song | B60W 60/0015 |
| 10,877,148 | B2 * | 12/2020 | Duque Biarge | G01S 13/9005 |
| 2012/0068881 | A1 * | 3/2012 | Abatzoglou | G01S 13/524 |
| | | | | 342/90 |
| 2015/0219758 | A1 * | 8/2015 | Gammenthaler | G08G 1/04 |
| | | | | 382/103 |
| 2017/0025013 | A1 * | 1/2017 | Lee | G06K 9/00805 |
| 2017/0343650 | A1 * | 11/2017 | Kanemaru | G01S 13/931 |
| 2018/0359010 | A1 * | 12/2018 | Lee | H04B 7/0615 |
| 2019/0079164 | A1 * | 3/2019 | Lim | G01S 7/40 |
| 2020/0158862 | A1 * | 5/2020 | Mahmoud | G01S 13/931 |
| 2020/0198650 | A1 * | 6/2020 | Ribbens | B60W 50/0205 |
| 2020/0209354 | A1 * | 7/2020 | Sumin | G01S 13/931 |

\* cited by examiner (a) BEFORE TARGET ANGLE ERROR APPLIED (b) AFTER TARGET ANGLE ERROR APPLIED

METHOD AND DEVICE FOR CORRECTING TARGET ANGLE ERROR OF RADAR SENSOR

CROSS-REFERENCE TO RELATED APPLICATIONS

This application claims priority to and the benefit of Korean Patent Application No. 10-2018-0106425, filed on Sep. 6, 2018, which is incorporated herein by reference in its entirety.

FIELD

The present disclosure relates to a method of correcting a target angle error of a radar sensor and a radar sensing device using the method.

BACKGROUND

The statements in this section merely provide background information related to the present disclosure and may not constitute prior art.

Recently, some vehicles have been equipped with a sensing device that senses the surroundings of the vehicles to improve safety and convenience for drivers.

To this end, various sensors can be applied to the sensing device to sense the surround of vehicles, but a type that uses a radar sensor having excellent sensing ability relative to an infrared sensor and an ultrasonic sensor is generally used.

In detail, a radar sensor senses an object around a vehicle and a controller calculates the position of a criterion object of the subject vehicle using a sensor signal input from the radar sensor.

Through this process, the controller calculates the distance and angle between the sensed object and the subject vehicle on the basis of the calculated position of the object, thereby being able to give a warning of a danger of collision or perform avoiding driving, or activate a cruise control function.

However, we have discovered that the position of the object sensed by the radar sensor and the actual position of the object may be different due to an error in mounting of the radar sensor, an error in manufacturing a bumper, and the shape of a bumper surface etc., so a target angle error may be generated.

SUMMARY

The present disclosure relates to a method of correcting a target angle error of a radar sensor, the method being able to correct a target angle error in more various driving situations by overcoming correctable limit conditions by correcting the target angle error using V2X communication when the target angle error is out of a predetermined angle range while recognizing a target position through a radar sensor, and being able to improve reliability in correction by reducing a correction error when depending only on the radar sensor, and a radar sensing device using the method.

A form of the present disclosure is directed to a method of correcting a target angle error of a radar sensor, the method being able to correct a target angle error in more various driving situations by overcoming correctable limit conditions by correcting the target angle error using V2X communication when the target angle error is out of a predetermined angle range while recognizing a target position through a radar sensor, and being able to improve reliability in correction by reducing a correction error when depending only on the radar sensor, and a radar sensing device using the method.

A method of correcting a target angle error of a radar sensor according to a form of the present disclosure includes: recognizing a first target angle of a target through the radar sensor; recognizing a second target angle of the target through V2X communication and then calculating a target angle error between the first target angle and the second target angle; comparing the target angle error with a predetermined critical error; and correcting a phase curve of the radar sensor by applying the target angle error to the phase curve in accordance with the comparison result, and then giving a target warning using the corrected phase curve.

According to an aspect, the method may further include giving a target warning using a previous phase curve in accordance with the comparison result, after the comparing.

The second target angle may be a target angle of the radar sensor that is recognized using position data and behavior data included in a V2X communication message received from the target.

The position data, which is GPS-based position information, may include latitude, longitude, an elevation, and the behavior data may include velocity, heading, a wheel angle, and acceleration etc.

The phase curve may be a graph showing the relationship between target angles and a phase difference of radio waves received from the radar sensor for a subject vehicle and the target angles.

A radar sensing device according to an form of the present disclosure includes: at least one or more processors; and a memory for storing computer-readable instructions, in which when the instructions are executed by the at least one or more processors, the instructions make the radar sensing device recognize a first target angle of a target through a radar sensor; recognize a second target angle of the target through V2X communication and then calculating a target angle error between the first target angle and the second target angle; compare the target angle error with a predetermined critical error; and correct a phase curve of the radar sensor by applying the target angle error to the phase curve in accordance with the comparison result, and then to give a target warning using the corrected phase curve.

When the instructions are executed by the at least one or more processors, the instructions may make the radar sensing device give a target warning using a previous phase curve in accordance with the comparison result, after comparing the target angle error with the predetermined critical error.

According to the present disclosure, it is possible to correct a target angle error in more various driving situations by overcoming correctable limit conditions by correcting the target angle error using V2X communication when the target angle error is out of a predetermined angle range while recognizing a target location through a radar sensor, and to improve reliability in correction by reducing a correction error when depending only on the radar sensor, and a radar sensing device using the method.

Further, it is possible to perform radar angle correction with high probability in more various situations by overcoming limit situations in correction of an object sensing error of a radar system.

Further, it is possible to accurately calculate the position of a target through sensing error correction of a radar, so more improve sensing ability can be maintained.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
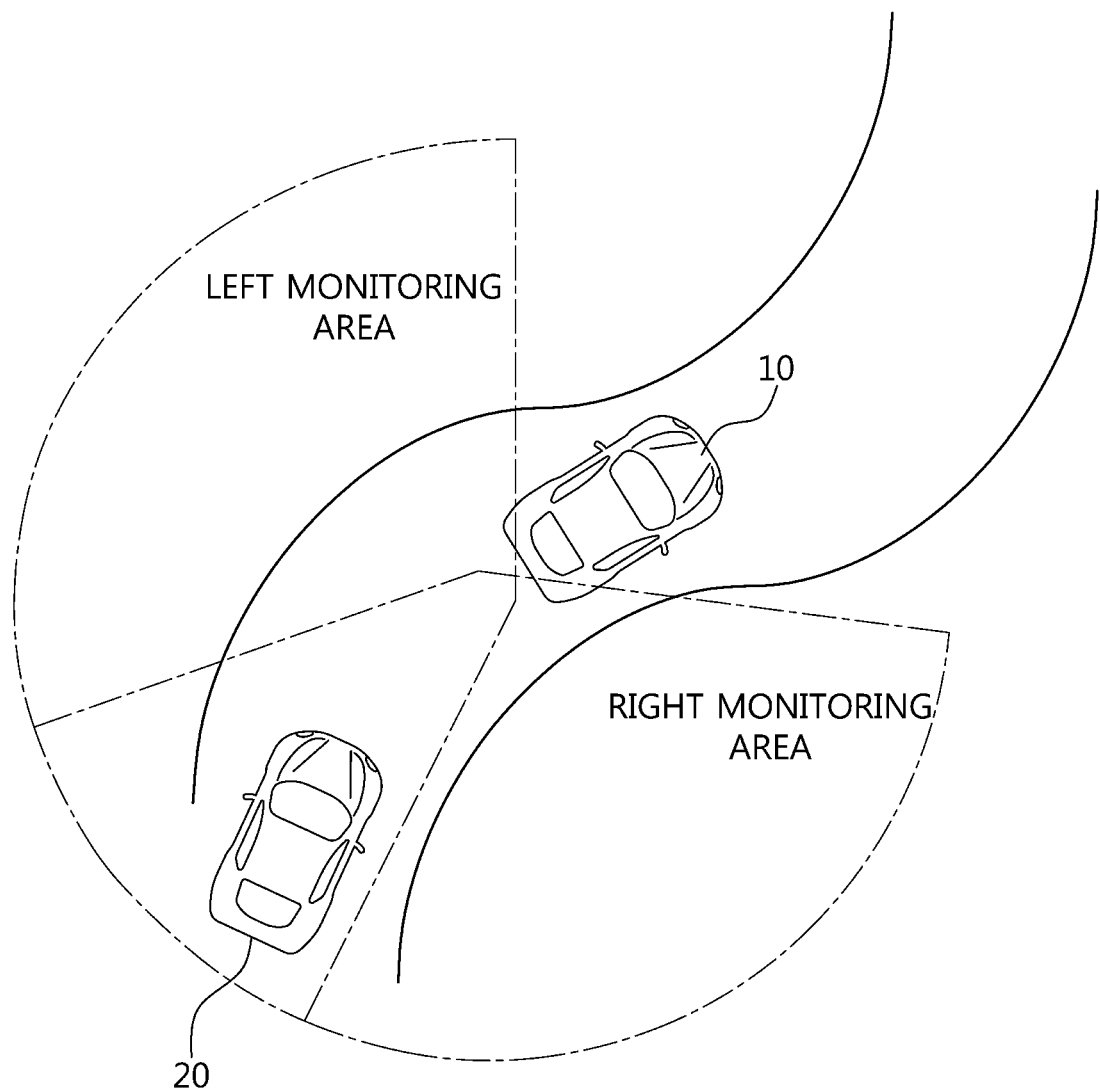
FIGS. 1 and 2 are diagrams illustrating a target recognition method based on a subject vehicle using a radar sensor.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Well-known function or configurations that may make the spirit of the present disclosure unclear may not be described in detail in the following description and the accompanying drawings.

Accordingly, the forms described herein and the configurations shown in the drawings may not represent all of the technical spirits of the present disclosure, so it should be appreciated that there may be various equivalents and modifications that fall within the spirit and scope of the present disclosure.

In the accompanying drawings, comes configurations may be exaggerated, omitted, or schematically shown, and the sizes of the configurations may not fully reflect the actual sizes. The present disclosure is not limited to the relative sizes of gaps shown in the accompanying drawings.

Throughout the present specification, unless explicitly described otherwise, "comprising" any components will be understood to imply the inclusion of other components rather than the exclusion of any other components. Further, when an element is referred to as being "connected with" another element, it may be "directly connected" to the other element and may also be "electrically connected" to the other element with another element intervening therebetween.

Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Further, the term "unit" used herein means a hardware component such as software, FPGA, or ASIC and the "unit" performs predetermined functions. However, the term "unit" is not limited to software or hardware. A "unit" may be configured to be stored in a storage medium that can be addressed or may be configured to regenerate one or more processors. Accordingly, for example, the "unit" includes components such as software components, object-oriented software components, class components, and task components, processors, functions, properties, procedures, subroutines, segments of a program code, drivers, firmware, a microcode, a circuit, data, a database, data structures, tables, arrays, and variables. Functions provided by the components and the "unit" may be combined in a smaller number of components and "unit" or may be further separated into additional components and "unit". Hereafter, forms of the present disclosure will be described in detail with reference to the accompanying drawings such that those skilled in the art can easily accomplish the present disclosure. However, the present disclosure may be modified in various different ways and is not limited to the forms described herein. Further, in the accompanying drawings, components irrelevant to the description will be omitted in order to obviously describe the present disclosure, and similar reference numerals will be used to describe similar components throughout the specification.

Figure 2:
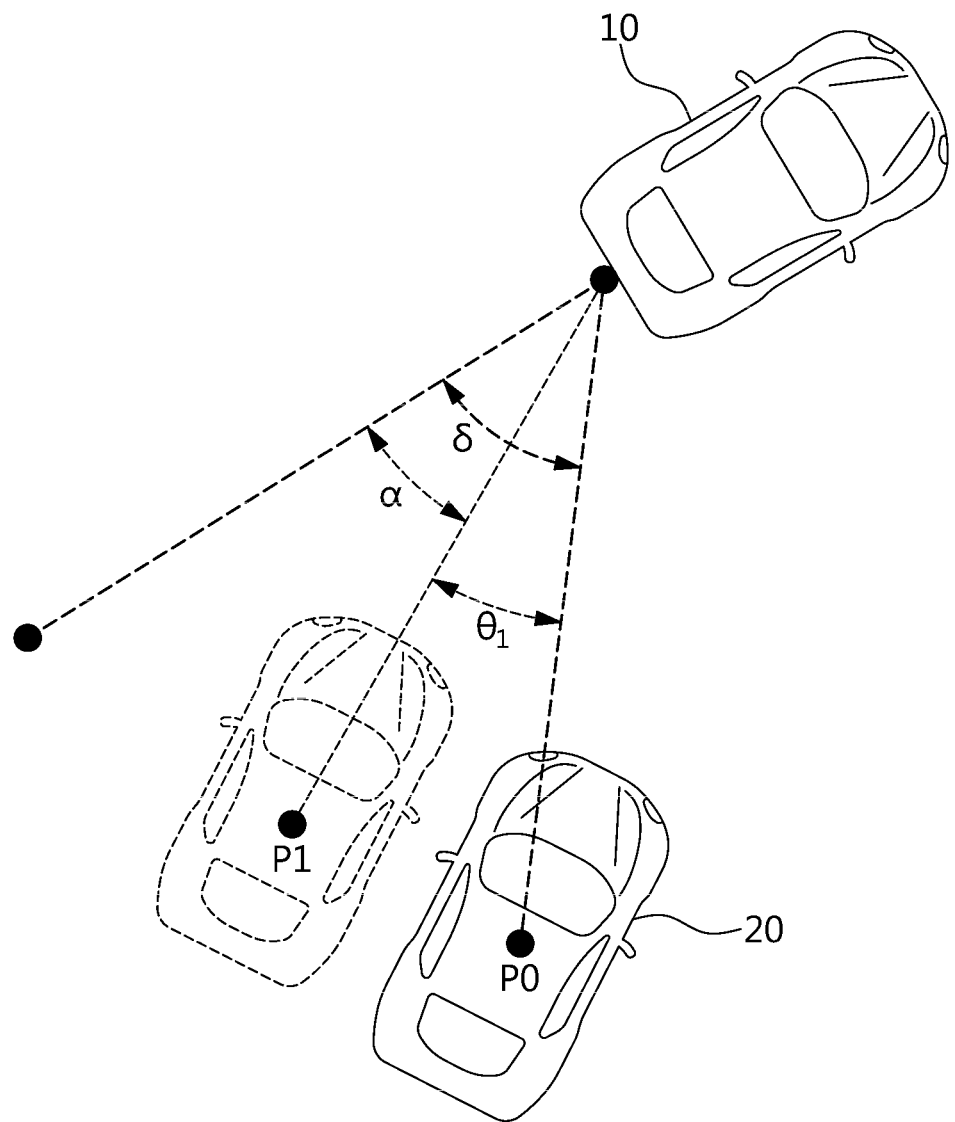

FIGS. 1 and 2 are diagrams illustrating a target recognition method based on a subject vehicle using a radar sensor.

Referring to FIG. 1, a subject vehicle 10 recognizes a target 20, which satisfies specific conditions, around the subject vehicle through a radar sensor.

The radar sensor can emit a radar signal to a predetermined monitoring area and recognize whether a specific object exists in the area using a reflection signal. Although an example of setting monitoring area in the left and right area of the subject vehicle is shown in FIG. 1, but the present disclosure is not limited thereto.

The subject vehicle 10 may differently recognize an actual target position and a target position recognized through the radar sensor when recognizing the position of the target using the radar sensor due to an error in mounting the radar sensor, an error in manufacturing a bumper, and the shape of a bumper surface. That is, the subject vehicle 10 recognizes an actual target angle differently from a target angle recognized by the radar sensor due to the target recognition error of the radar sensor.

Referring to FIG. 2, the position of the target 20 recognized through the radar sensor is 'P1', but the actual position of the target 20 is 'P0.' In this case, a target angle error $\theta_1$ is generated between a target angle $\alpha$ recognized through the radar sensor and an actual target angle $\delta$.

In this case, it is possible to correct the target angle error $\theta_1$ under the assumption that the subject vehicle 10 and the target 20 are positioned in parallel when a limit condition in which the subject vehicle 10 is drives straight and the target 20 positioned straight around the subject vehicle is continuously sensed is satisfied.

That is, the subject vehicle 10 senses the target 20 that satisfies the limit condition around the subject vehicle while driving straight. The target 20 may be another vehicle or a guard rail around the subject vehicle.

When a straight target sensed by the radar sensor has an angular difference from the driving direction of the subject vehicle during straight driving, the subject vehicle 10 performs correction as much as the angle. The subject vehicle 10 can give a target warning using a phase curve that is a graph showing a phase difference of radio waves received from the radar sensor for angles of the target 20 (see FIG. 5 to be described below). The phase curve is used to calculate the angle of the target 20 using the phase difference. That is, the phase curve is a graph showing the relationship between the target angles and the phase difference of radio waves received from the radar sensor for target angles.

However, in this case, when the limit condition that can correct the target angle error $\theta_1$ is satisfied, the target angle error can be corrected by applying the target angle error to the phase curve.

A method that can correct the target angle error $\theta_1$ by applying the target angle error $\theta_1$ in more various driving situations by overcoming the limit condition that can correct the target angle error $\theta_1$ and that improve reliability in correction by reducing an error in correction that is generated when depending on only a radar sensor is described with reference to FIGS. 3 to 6.

Figure 3:
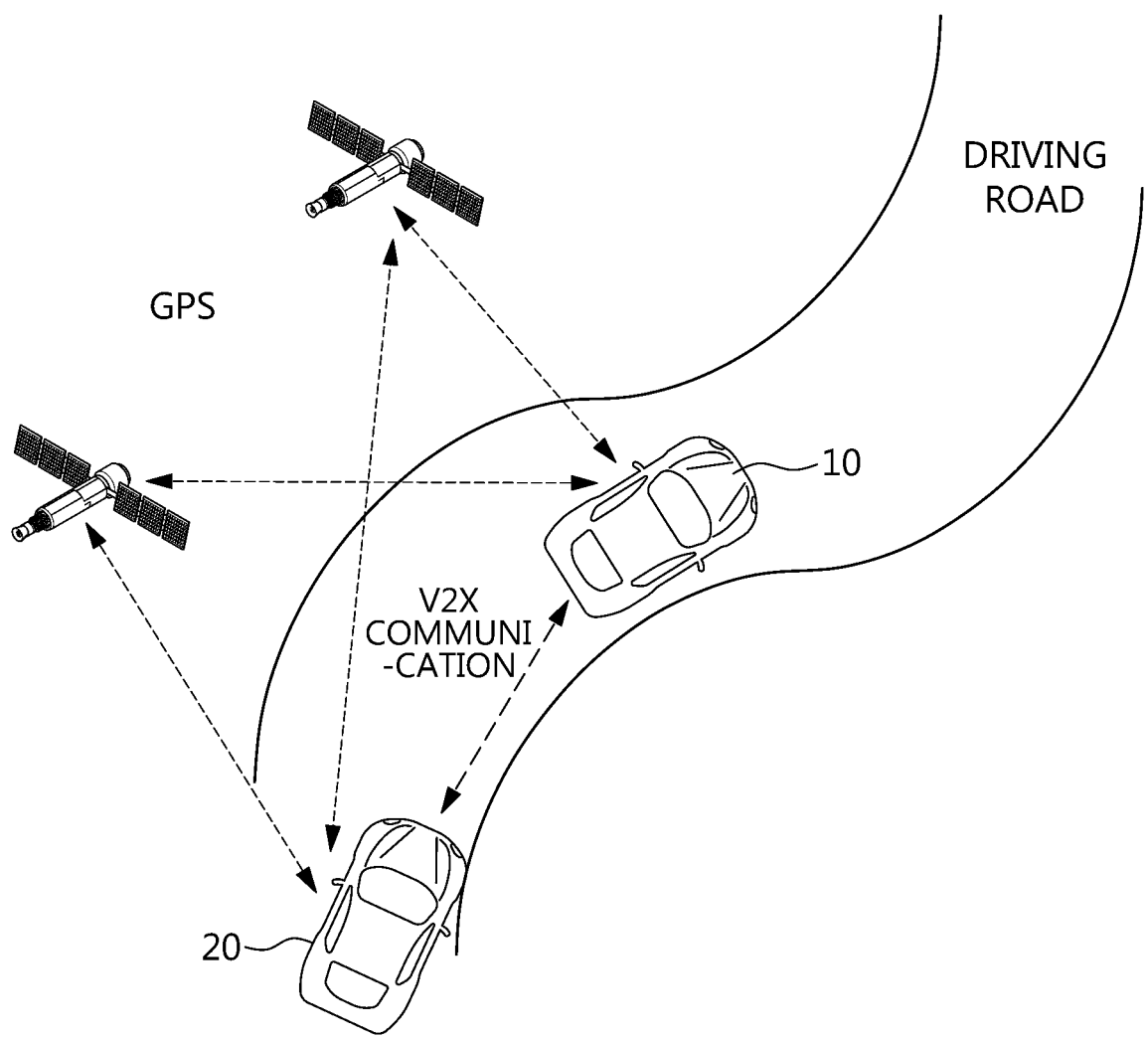
FIGS. 3 and 4 are diagrams illustrating a target recognition method based on V2X communication using communication between a target and a subject vehicle.
Figure 4:
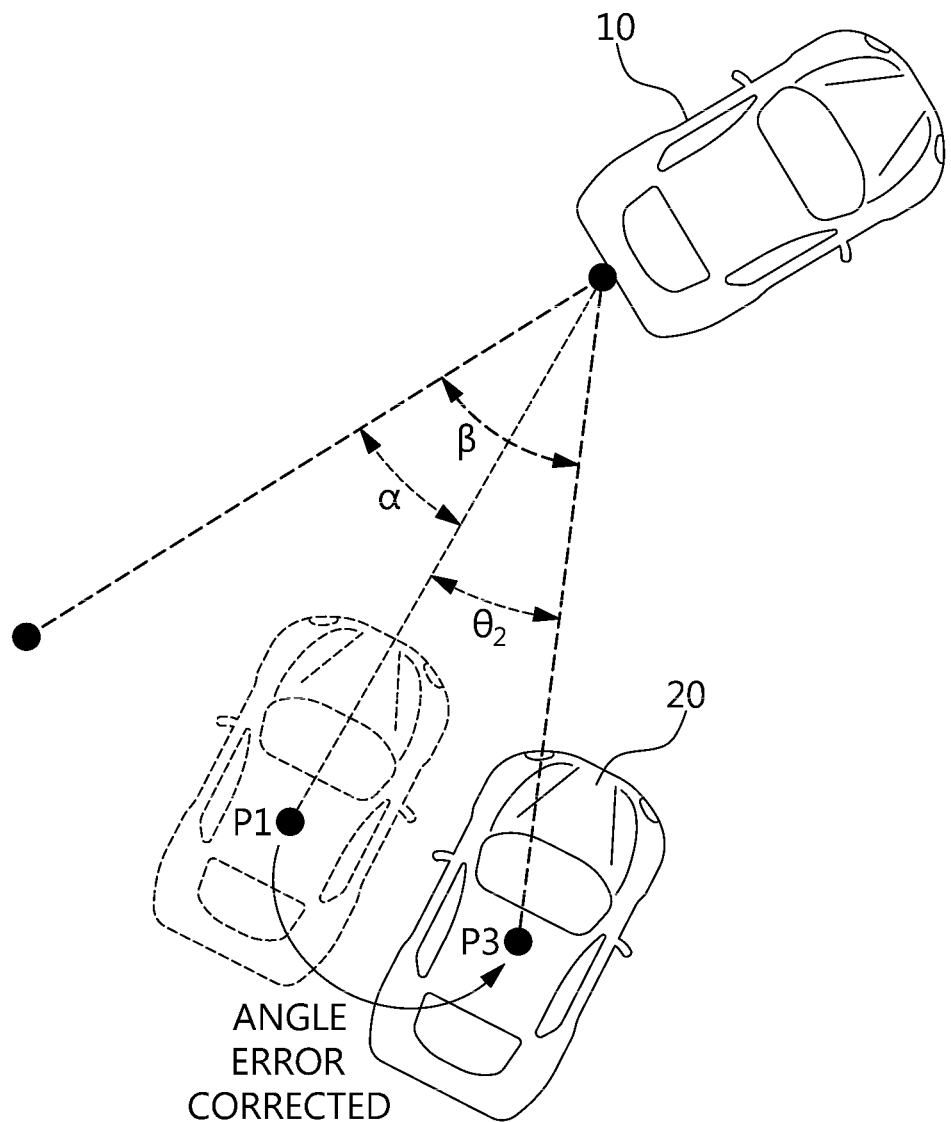

FIGS. 3 and 4 are diagrams illustrating a target recognition method based on V2X communication using communication between a target and a subject vehicle.

Referring to FIGS. 3 and 4, a subject vehicle 10 corrects a target angle error θ2 using V2X (Vehicle to Everything) communication with a target 20 to overcome a limit condition on a radar correction function through a radar sensor.

That is, the subject vehicle 10 fundamentally recognizes a target position through the radar sensor, and corrects the target angle error $\theta_2$ using V2X communication when the target angle error $\theta_2$ comes out of a predetermined angle range.

First, the subject vehicle 10 checks a target angle α recognized through the radar sensor.

The target angle α recognized through the radar sensor is a target angle based on the subject vehicle, is calculated as an angle where the target 20 is positioned with respect to the subject vehicle by determining the position of the target 20 recognized through the radar sensor, and corresponds to the target angle recognized through a radar stated with respect to FIG. 2.

Next, the subject vehicle 10 can exchange a V2X communication message through a wire/wireless network by performing V2X communication with the target 20.

This is for correcting a target angle error regardless of the driving situation of the subject vehicle 10 and the shape of the target 20 if V2X communication with the target 20 is possible.

That is, the subject vehicle 10 cannot perform V2X communication with the target 20 all the time, so it is possible to more precisely recognize a target angle by recognizing first a target angle through the radar sensor and then correcting a target angle error of the radar sensor using the target angle recognized through V2X communication when V2X communication with the target 20 is possible.

V2X communication may include all types of communication technologies that can be available for vehicles on roads such as Vehicle-to-Vehicle (V2V) communication, Vehicle-to-Infra (V2I) communication, Vehicle-to-Pedestrian (V2P) communication, and Vehicle-to-Nonadic Device (V2N) communication.

Accordingly, only V2V communication is shown in FIGS. 3 and 4, the target 20 may have a concept collectively indicating a road infrastructure, a pedestrian, and a personal terminal.

Further, the V2X communication message may include position and behavior data of the target 20. The position data, which is GPS-based position information, includes latitude, longitude, an elevation etc., and the behavior data includes velocity, heading, a wheel angle, and acceleration etc.

As described above, the subject vehicle 10 can check the position and behavior data of the target 20 by receiving a V2X communication message from the target 20. The subject vehicle 10 checks a target angle ß recognized through V2X communication using the position and behavior data of the target 20.

The target angle ß recognized through V2X communication is substantially the same as the actual target angle δ. Accordingly, a target angle error $\theta_1$ between the target angle α recognized through the radar sensor and the actual target angle δ is substantially the same as a target angle error $\theta_2$ between the target angle α recognized through the radar sensor and the target angle ß recognized through V2X communication. That is, $\delta \approx ß$ and $\theta_1 \approx \theta_2$.

As described above, the subject vehicle 10 can correct the target angle error by applying the target angle error to the phase curve using the target angle ß recognized through V2X communication that correspond to the actual target angle δ. The subject vehicle 10 calculates the target angle error $\theta_2$ between the target angle α recognized through the radar sensor and the target angle ß recognized through V2X communication. That is, 02=B-a.

In detail, the subject vehicle 10 performs correction on the phase curve in accordance with the result of comparing the target angle error $\theta_2$ with a predetermined critical error.

That is, when the target angle error $\theta_2$ is larger than the predetermined critical error, the subject vehicle 10 performs correction by applying the target angle error $\theta_2$ to the phase curve and then gives a target warning. The phase curve is provided to calculate a target angle through a radar sensor in a radar sensing device and the target angle error $\theta_2$ is applied to a period with a target angle error.

Figure 5:
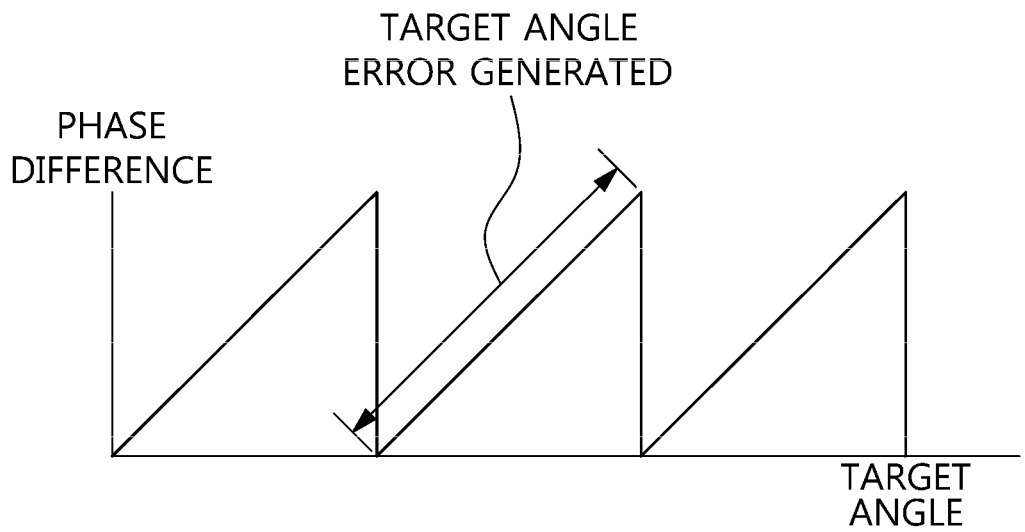
FIG. 5 is a diagram illustrating the cases before and after a target angle error is applied to a phase curve.
Figure 5:
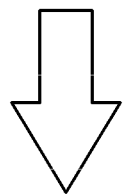
Figure 5:
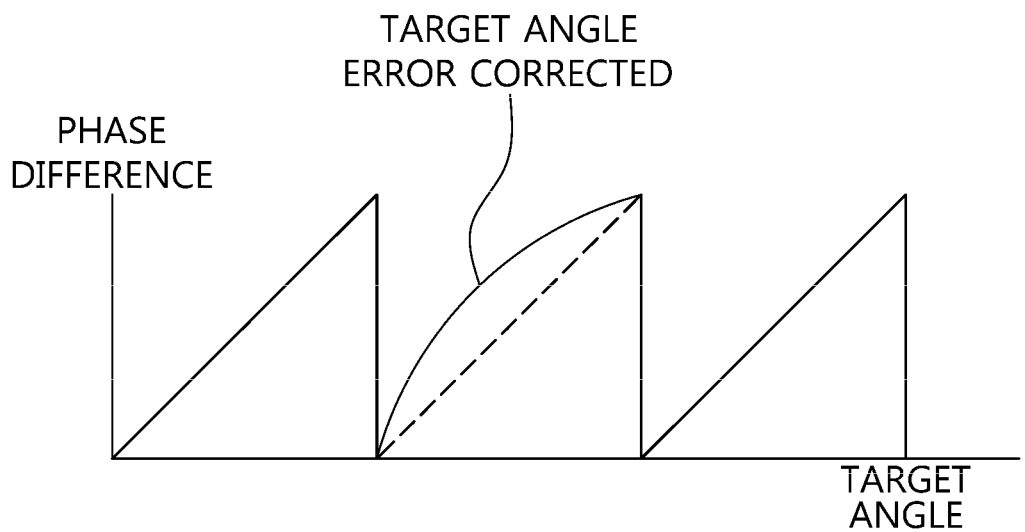

On the other hand, when the target angle error $\theta_2$ is smaller than the predetermined critical error, the subject vehicle 10 gives a target warning without applying the target angle error $\theta_2$ to the phase curve. In this case, the target angle error $\theta_2$ is not applied to the phase curve (see (a) of FIG. 5). FIG. 5 is a diagram illustrating the cases before and after a target angle error is applied to a phase curve.

As described above, the subject vehicle 10 can correct a target angle error of the radar sensor including a radar sensing device. In particular, the radar sensing device, which is at least one or more processors, includes a memory for storing computer-readable instructions. The instructions stored in the memory allowing the radar sensing device to perform the method of correcting a target angle error of the radar sensor when they are executed by at least one or more processors.

Figure 6:
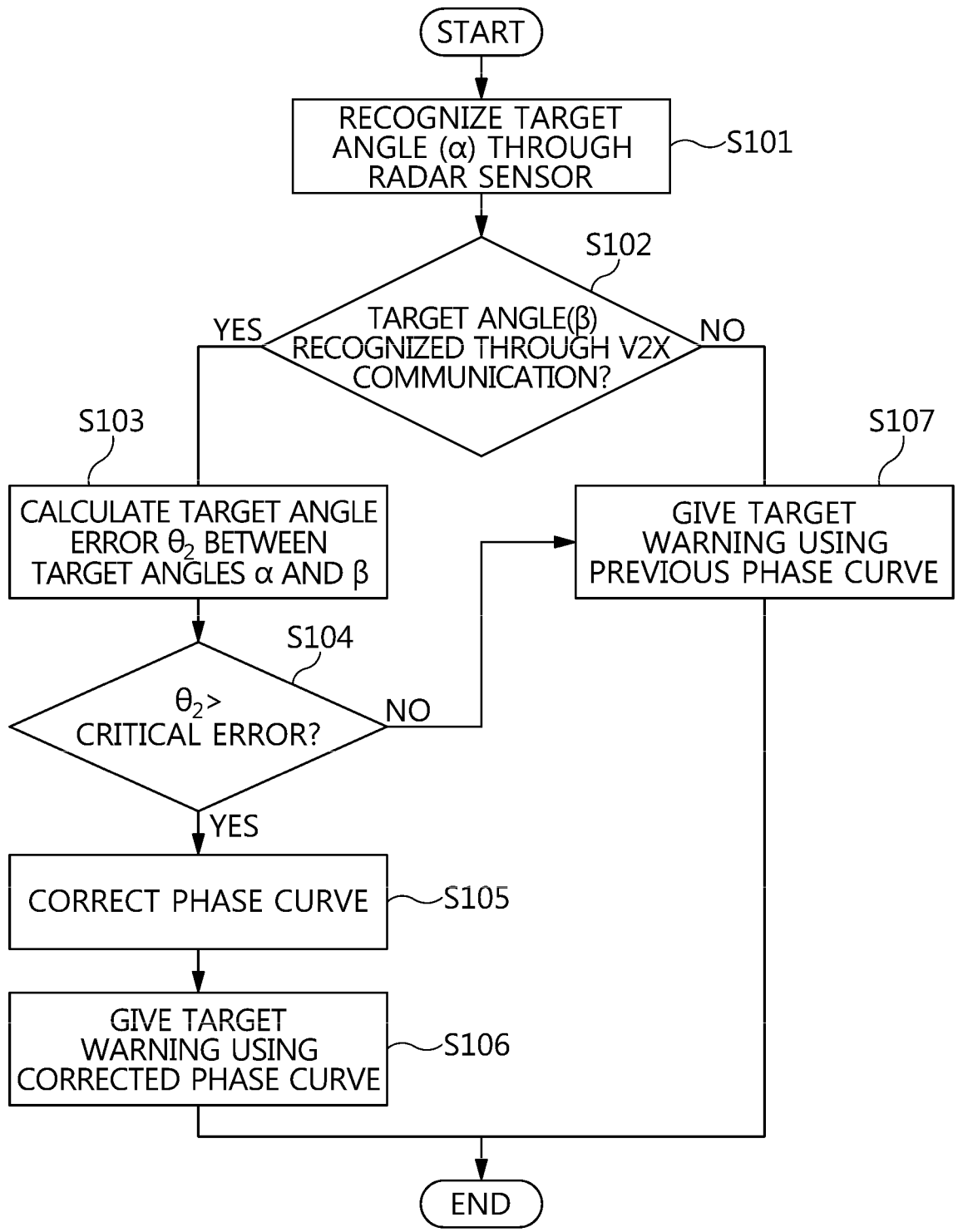
FIG. 6 is a diagram illustrating a method of correcting a target angle error of a radar sensor according to a form of the present disclosure.

The method of correcting a target angle error of the radar sensor is described hereafter with reference to FIG. 6.

FIG. 6 is a diagram illustrating a method of correcting a target angle error of a radar sensor according to an form of the present disclosure.

First, the radar sensing device recognizes a target angle α through the radar sensor (S101).

Thereafter, when recognizing a target angle ß through V2X communication (S102), the radar sensing device calculates a target angle error $\theta_2$ between the target angle ß recognized through the radar sensor and the target angle ß recognized through V2X communication (S103).

The radar sensing device compares the calculated target angle error $\theta_2$ with a predetermined critical error (S104).

That is, when the target angle error $\theta_2$ is larger than the critical error (S104), the radar sensing device performs correction by applying the target angle error $\theta_2$ to the period with the target angle error $\theta_2$ in the phase curve (S105).

Thereafter, the radar sensing device gives a target warning using the corrected phase curve (S106). In this case, the corrected phase curve has been corrected by applying the target angle error $\theta_2$ to the phase curve, as in (b) of FIG. 5.

When V2X communication is impossible (S102) or when the target angle error $\theta_2$ is smaller than the critical error (S104), the radar sensing device gives a target warning using the previous phase curve (S107). In this case, the previous phase curve is a phase curve before the target angle error $\theta_2$ is applied to the phase curve, as in (a) of FIG. 5.

The method according to an form may be implemented in a program that can be executed by various computers and may be recorded on computer-readable media. The computer-readable media may include program commands, data files, and data structures of combinations thereof. The program commands that are recorded on the media may be those specifically designed and configured for the present disclosure or may be those available and known to those engaged in computer software in the art. The computer-readable recording media include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory. The program commands include not only machine language compiled by a compiler, but also high-level language code that can be executed by a computer using an interpreter.

Although above description addresses new characteristics of the present disclosure that are applied to various forms, it will be understood by those skilled in the art that the configuration and details of the device and method described above may be removed, replaced, and modified in various way without departing from the scope of the present disclosure. Accordingly, the scope of the present disclosure is defined by the following claims rather than the above description. All modifications within equivalent ranges to the claims are included in the scope of the present disclosure.

What is claimed is:

1. A method of correcting a target angle error of a radar sensor including memory and a processor configured to execute instructions stored in the memory, the method comprising:
   detecting, by the processor, a first target angle of a target through the radar sensor;
   detecting, by the processor, a second target angle of the target through V2X communication and then calculating, by the processor, a target angle error between the first target angle and the second target angle;
   determining, by the processor, whether the target angle error is greater than a predetermined value;
   when it is determined that the target angle error is greater than the predetermined value, correcting, by the processor, a phase curve of the radar sensor by applying the target angle error to the phase curve, and then providing a target warning using the phase curve; and
   when it is determined that the target angle error is less than or equal to the predetermined value, providing, by the processor, the target warning using a previous phase curve without applying the target angle error to the phase curve.

2. The method of claim 1, wherein the second target angle is a target angle of the radar sensor that is recognized using position data and behavior data included in a V2X communication message received from the target.

3. The method of claim 2, wherein the position data, which is GPS-based position information, includes latitude, longitude, an elevation, and
   the behavior data includes velocity, heading, a wheel angle, and acceleration.

4. The method of claim 1, wherein the phase curve is a graph showing a relationship between target angles and a phase difference of radio waves received from the radar sensor for a subject vehicle and the target angles.

5. A radar sensing device comprising:
   memory; and
   a processor configured to execute instructions stored in the memory and to:
   detect a first target angle of a target through a radar sensor;
   detect a second target angle of the target through V2X communication and then calculate a target angle error between the first target angle and the second target angle;
   determine whether the target angle error is greater than a predetermined value;
   when it is determined that the target angle error is greater than the predetermined value, correct a phase curve of the radar sensor by applying the target angle error to the phase curve, and then provide a target warning using the phase curve; and;
   when it is determined that the target angle error is less than or equal to the predetermined value, provide the target warning using a previous phase curve without applying the target angle error to the phase curve.

6. The radar sensing device of claim 5, wherein the second target angle is a target angle of the radar sensor that is recognized using position data and behavior data included in a V2X communication message received from the target.

7. The radar sensing device of claim 6, wherein the position data, which is GPS-based position information, includes latitude, longitude, an elevation, and
   the behavior data includes velocity, heading, a wheel angle, and acceleration.

8. The radar sensing device of claim 5, wherein the phase curve is a graph showing the relationship between target angles and a phase difference of radio waves received from the radar sensor for a subject vehicle and the target angles.

* * * * *